(12) United States Patent
Gudat

(10) Patent No.: US 9,605,409 B2
(45) Date of Patent: Mar. 28, 2017

(54) SYSTEM AND METHOD FOR OPERATING A MACHINE

(75) Inventor: Adam John Gudat, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 1827 days.

(21) Appl. No.: 12/416,061

(22) Filed: Mar. 31, 2009

(65) Prior Publication Data

US 2010/0250023 A1 Sep. 30, 2010

(51) Int. Cl.
*G05D 1/00* (2006.01)
*E02F 9/20* (2006.01)
*E02F 9/26* (2006.01)
*G05D 1/02* (2006.01)

(52) U.S. Cl.
CPC ............ *E02F 9/2045* (2013.01); *E02F 9/205* (2013.01); *E02F 9/2054* (2013.01); *E02F 9/262* (2013.01); *E02F 9/265* (2013.01); *G05D 1/0022* (2013.01); *G05D 1/0274* (2013.01); *G05D 1/0278* (2013.01); *G05D 2201/0202* (2013.01)

(58) Field of Classification Search
CPC ....... E02F 9/2045; E02F 9/205; E02F 9/2054; E02F 9/262; G05D 1/0022; G05D 1/0274; G05D 1/0278; G05S 2201/0202
USPC ........................................ 701/2, 50, 112, 48
See application file for complete search history.

(56) References Cited

U.S. PATENT DOCUMENTS

| | | | | |
|---|---|---|---|---|
| 5,448,479 A * | 9/1995 | Kemner | ................... | B62D 1/28 180/167 |
| 5,469,356 A * | 11/1995 | Hawkins | ................ | G01C 21/26 318/591 |
| 6,633,800 B1 * | 10/2003 | Ward | .................... | B60W 50/02 180/167 |
| 6,899,103 B1 * | 5/2005 | Hood | ....................... | A61G 1/00 128/845 |
| 7,277,784 B2 | 10/2007 | Weiss | | |
| 2002/0195275 A1 * | 12/2002 | Brand | .................... | E21B 44/00 175/24 |
| 2006/0271263 A1 * | 11/2006 | Self | ......................... | G01S 3/143 701/50 |
| 2007/0093954 A1 * | 4/2007 | Malone | ................... | F02D 41/22 701/112 |
| 2009/0142147 A1 * | 6/2009 | Pope | ................. | B65G 53/4633 406/51 |

* cited by examiner

Primary Examiner — Shardul Patel
(74) Attorney, Agent, or Firm — Finnegan, Henderson, Farabow, Garrett & Dunner, LLP

(57) ABSTRACT

A system and method for operating a machine is disclosed. The system may include an input device configured to select from a plurality of modes of operation for the machine, the plurality of modes of operation comprising a manual mode, a remote mode, and an autonomous mode. The system may further include a controller coupled to the machine, the controller configured to place the machine in the selected mode of operation based on an input at the input device. The system may further include a transmitter configured to transmit a heartbeat signal. The system may further include a receiver configured to receive an acknowledgment signal from a remote system in response to the transmitted heartbeat signal.

12 Claims, 5 Drawing Sheets

SYSTEM AND METHOD FOR OPERATING A MACHINE

TECHNICAL FIELD

The present disclosure relates generally to operating machines, and more particularly to a system and method for operating a machine in a remote or an autonomous mode.

BACKGROUND

Mining and large scale excavating operations may require fleets of machines to transport excavated material (e.g., dirt, rocks, gravel, etc.) from an area of excavation to a secondary location. For such an operation to be productive and profitable, the fleet of machines must be efficiently operated. One way to efficiently operate a fleet of machines is to reduce the number of operators required to operate the fleet by, for example, operating machines in a remote and/or an autonomous mode.

A system for operating a machine in an autonomous mode is disclosed in U.S. Pat. No. 7,277,784 (the '784 patent), issued to Weiss. The '784 patent discloses operating a manned harvester and an unmanned transport machine. The unmanned transport machine contains a control unit connected to a receiving unit that is configured to receive position data from the harvester. The control unit operates the transport machine based on the position data from the harvester and, for example, drives the transport machine relative to the position of the harvester.

Although the '784 patent may increase the efficiency of a fleet of machines by reducing the number of required operators, the '784 patent may not be suitable for operating multiple machines in an excavating operation. In particular, the '784 patent may be incapable of allowing a machine the ability to operate in a remote and/or an autonomous mode while performing multiple different operations with little supervision.

The disclosed system and method is directed towards improving existing systems and methods for operating machines.

SUMMARY

In one aspect, the present disclosure is directed to a system for operating a machine. The system may include an input device configured to select from a plurality of modes of operation for the machine, the plurality of modes of operation comprising a manual mode, a remote mode, and an autonomous mode. The system may further include a controller coupled to the machine, the controller configured to place the machine in the selected mode of operation based on an input at the input device. The system may further include a transmitter configured to transmit a heartbeat signal. The system may further include a receiver configured to receive the transmitted heartbeat signal.

In another aspect, the present disclosure is directed to a method for operating a machine. The method may include selecting a single mode of operation for the machine from a plurality of modes of operation for the machine, the plurality of modes of operation comprising a manual mode, a remote mode, and an autonomous mode. The method may further include placing the machine in the selected mode of operation. The method may further include transmitting a heartbeat signal.

In another aspect, the present disclosure is directed to a machine configured to operate in a plurality of modes. The machine may include a controller configured to place the machine in a selected mode of operation based on an input at an input device, the selected mode of operation being one of a manual mode, a remote mode, and an autonomous mode. The machine may further include a communication device configured to receive or send a first signal.

DETAILED DESCRIPTION

Figure 1:
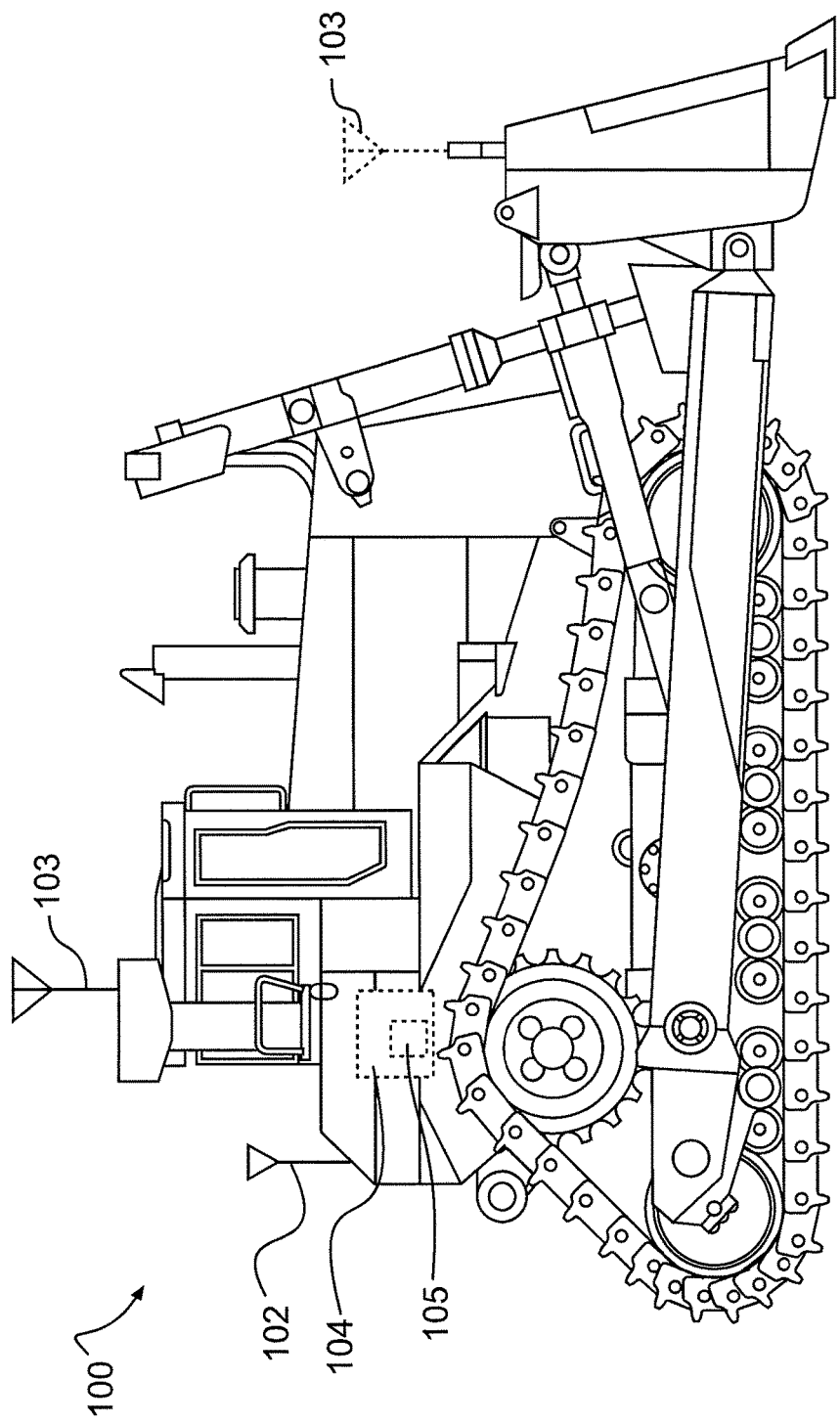
FIG. 1 is a diagrammatic illustration of exemplary disclosed machine.

FIG. 1 illustrates an exemplary machine 100. Although machine 100 is illustrated as a dozer, machine 100 may be any type of machine that performs some type of operation associated with an industry such as mining, construction, farming, transportation, etc. For example, machine 100 may be an earth moving machine such as, for example, an excavator, a loader, a backhoe, a dozer, a motor grader, and the like.

Machine 100 may comprise a wireless communication device 102, a GPS antenna 103, and a controller 104. Wireless communication device 102 may comprise one or more wireless devices configured to send and/or receive wireless communications to and/or from remote locations. For example, machine 100 may use wireless communication device 102 to wirelessly exchange information with other machines, and/or a remote site such as, for example, a control center (not shown). Controller 104 may comprise a system of one or more electronic control modules configured to identify one or more functions and/or operations of machine 100 that may be adjusted and controlled by a remote control and/or autonomously.

GPS antenna 103 may embody any position monitoring device suitable for gathering three-dimensional (e.g., x, y, and z) coordinate information associated with machine 100 or an implement or tool associated therewith. According to one embodiment, GPS antenna 103 may be located on a work implement (e.g. a blade) of machine 100 in order to monitor the precise location of the work implement. Such a configuration may enable machine 100 and/or an off-board terrain design system to determine, among other things, the progress and productivity of earth-moving operations and other tasks performed by machine 100 and work implements associated therewith. According to another embodiment, GPS antenna 103 may be located on the cab (or another location on machine 100). Such a configuration may be ideal for keeping GPS antenna 103 protected from certain ground-level hazards. However, such configuration may require additional sensors to be connected to the work implement, in order to precisely determine the position of work implement. It is contemplated that machine 100 may include multiple GPS antennae 103 in order to provide a redundancy, in the event that one or more of the other GPS antennae 103 should malfunction or otherwise become inoperable.

In order to perform the desired operations of machine 100, controller 104 may include one or more computer mapping systems 105. The computer mapping system(s) 105 may be comprised of tables, graphs, and/or equations. The computer mapping system(s) 105 may relate to desired actuator speed or force, associated flow rates and pressures, valve element positions associated with movement of hydraulic cylinders, acceleration, velocity, braking, steering, and/or desired and current position and orientation of machine 100. It is contemplated that the computer mapping system(s) 105 may be comprised of additional information required to perform the autonomous and/or remote operation of machine 100. It is further contemplated that an operator of machine 100 may modify these mapping system(s) and/or select specific maps from available relationship maps stored in memory. In one example, the maps may additionally or alternatively be automatically selectable based on modes of machine operation. In yet another example, the computer mapping system(s) 105 may be continuously updated with geographical and topographical information of the working environment via wireless communication device 102, and/or any other suitable communication device. Alternatively or additionally, the computer mapping system(s) 105 may be continuously updated by controller 104 associated with machine 100. For example, GPS antenna 103 of machine 100 monitors the position of the blade during operation of machine 100. This information may be fed into controller 104, which may continuously and/or periodically update the computer mapping system(s) 105.

One skilled in the art will appreciate that controller 104 may include additional and/or different components than those listed above. For example, controller 104 may include one or more other components or subsystems such as, for example, power supply circuitry, signal conditioning circuitry, solenoid driver circuitry, and/or any other suitable circuitry for aiding in the control of one or more systems of machine 100.

Figure 2:
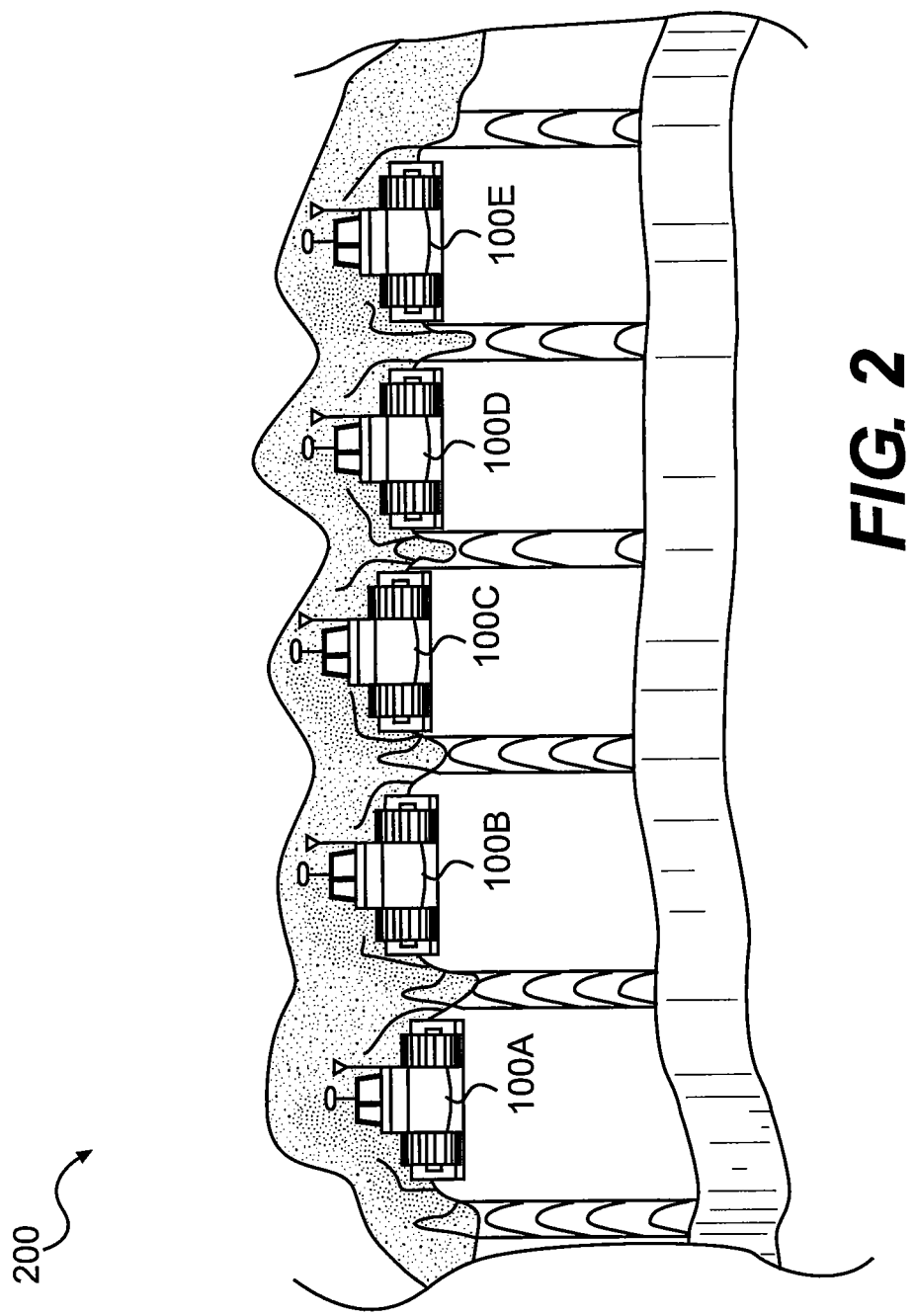
FIG. 2 is a diagrammatic illustration of an exemplary disclosed work environment for the machine of FIG. 1.

Illustrated in FIG. 2 is an exemplary embodiment where a plurality of machines 100A, 100B, 100C, 100D, and 100E, collectively referred to herein as machines 100A-100E, work together to perform an operation in a work environment 200 consistent with the disclosed embodiments and their equivalents. Although FIG. 2 illustrates a specific number and type of machines (i.e., five of machines 100) working together autonomously or being controlled remotely, it is contemplated that any number and/or types of machines may work together autonomously or be controlled remotely. Additionally, although work environment 200 illustrates an above-ground mining environment, it is contemplated that work environment 200 may be representative of other working environments such as, for example, a construction environment, a farming environment, a below-ground mining environment, etc.

As illustrated in FIG. 2, machines 100A-100E may work together autonomously to remove overburden that is covering a desired material. It is contemplated that the desired material may be any type of material such as, for example, a fossil fuel. In one embodiment, to remove the overburden, machines 100A-100E may autonomously load the overburden at a first location. Machines 100A-100E may then autonomously travel to a second location to dump the overburden. After machines 100A-100E dump the overburden, machines 100A-100E may then autonomously return to the first location to load more overburden for transport.

In order to accomplish the autonomous operations, controllers 104 of machines 100A-100E may be preprogrammed and continuously updated with information such as, for example, geographical and topographical information of the worksite, and the position and orientation of other machines at the worksite. Respective controllers 104 of machines 100A-100E may then use the preprogrammed and continuously updated information to assist in the operations of machines 100A-100E, independent of an operator to obtain the desired topology of the site.

In another embodiment, to remove the overburden, machines 100A-100E may be controlled remotely by an operator. As an example, as machines 100A-100E operate autonomously, machine 100C may have removed all of the overburden from its surroundings. In this example, an operator may, via remote control, stop the autonomous mode of machine 100C, and move machine 100C to a desired third location where overburden is required to be moved. Once machine 100C is at the desired third location, the operator may then place the machine back into autonomous mode. Machine 100C may then autonomously upload the terrain data base and the desired site plan and then proceed to load overburden from its surrounding location, and transport and dump the overburden at a desired location. Machine 100C may then autonomously return to the third location and repeat the overburden removal process. It is contemplated that an operator may remotely operate one of machines 100A-100E through the entire process of removing overburden while the other machines operate autonomously.

In one embodiment, while machine 100 operates in an autonomous mode, a wireless signal (i.e., a heartbeat signal) may be sent from/to machine 100. The heartbeat signal may originate from the machine at the worksite, and communicate with a remote location such as, for example, a remote control device operated by an operator, or a remote management site. The heartbeat signal may be used as a way to monitor and/or stop the operations of machine 100. As an example, if at any time machine 100 stops exchanging the heartbeat signal, machine 100 may come to a controlled stop and place itself in a safe mode. It is contemplated that machine 100 will not enter an autonomous mode until the heartbeat signal is acknowledged. It is further contemplated that a remote operator may have the ability to start and/or stop the heartbeat acknowledgement and response at any time, thus controlling when machine 100 may operate in an autonomous mode.

In another embodiment, while machine 100 operates in an autonomous mode, machine 100 may transmit a heartbeat signal to a computer system at a remote management site. The heartbeat signal may communicate to the computer system the status and operations that machine 100 is performing. If, based on the received heartbeat signal, the computer system at the remote management site determines that machine 100 is performing unauthorized operations, the computer system may send a signal to machine 100, the signal forcing machine 100 to end all operations and place its self in a safe mode. It is contemplated that the computer system at the remote management site may be able to monitor several of machines 100 while they operate in autonomous mode.

As an example, to remove overburden from worksite 200, machines 100A-100E may autonomously load the overburden at a first location, and then travel to a second location to dump the overburden. While machines 100A-100E are autonomously loading and transporting the overburden, each of machines 100A-100E may be transmitting a heartbeat signal to a computer system at a remote management site, each of the heartbeat signals communicating to the computer system the operations of machines 100A-100E, respectively. Additionally, while transporting a load to a dump site, machine 100A may veer of course, and if not corrected by the on board machine controller, the computer system at the remote management site may receive, via a communication device, the heartbeat signal indicating that machine 100A has veered of course on its way to the dump site. In response to the received heartbeat signal, the computer system at the management site may send a signal to machine 100A, the signal forcing machine 100A to end all operations and place itself in a safe mode.

INDUSTRIAL APPLICABILITY

The disclosed system and method for operating machines may increase the efficiency of work environment operations by reducing the number of operators required to operate a fleet of machines. The disclosed system and method for operating machines may reduce the number of operators required to operate a fleet of machines by allowing the machines to be operated in a remote and/or an autonomous mode.

Figure 3:
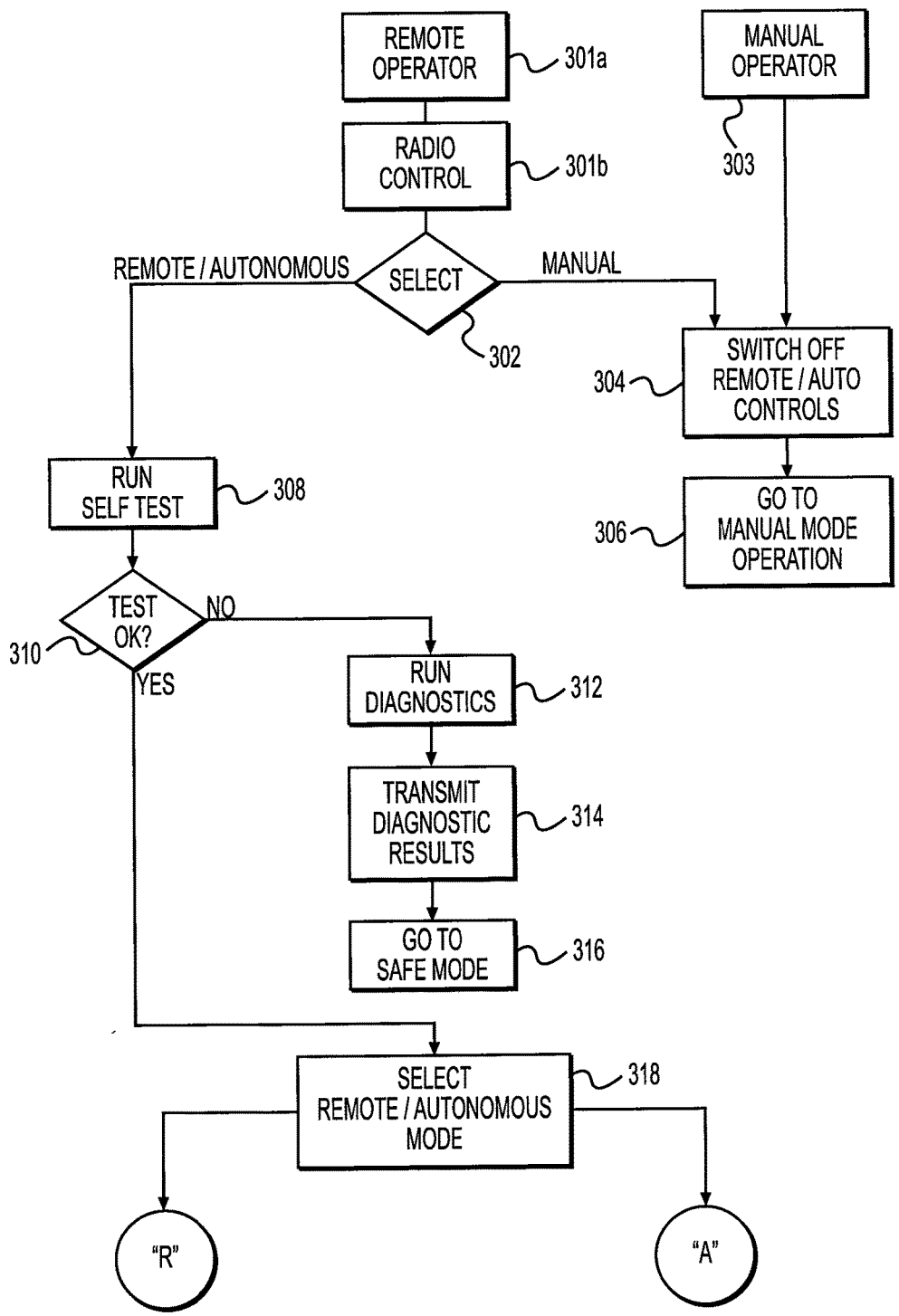
FIG. 3 is an exemplary method for placing the machine of FIG. 1 in a manual, remote, or autonomous mode.

FIG. 3 shows a flowchart 300 illustrating a method for placing machine 100 in a manual, remote, or autonomous mode consistent with the disclosed embodiments and their equivalents. For remote/autonomous operation, a remote operator 301a uses a radio control console 301b to select a manual, remote, or autonomous mode for machine 100 (Step 302). For manual operation, a manual operator 303 switches off remote/autonomous operation (Step 304) via, for example, a selector switch on the console in the machine cab. If the operator selects a manual mode of operation for machine 100, the remote and automated controls at machine 100 will automatically be switched off (Step 304), and machine 100 will enter a manual mode operation (Step 306).

If the operator selects remote or autonomous mode for machine 100, machine 100 may perform a self-test (Step 308). Machine 100 may self-test components such as, for example, hydraulic controls, communication links, etc. As an example, machine 100 may initiate a self-test command to move a hydraulically controlled implement coupled to machine 100. Machine 100 may then use sensors to verify that the implement did indeed move corresponding to the command. In one embodiment, the sensors may be pressure sensors that correspond to the movement of the hydraulically controlled implement. If machine 100 identifies a component that fails a self-test command (Step 310, No), machine 100 may run diagnostics to locate the source of the failure (Step 312). For example, after machine 100 initiates a self-test command to move a hydraulically controlled implement coupled to machine 100, a pressure sensor associated with the implement may indicate that the implement did not move, or that the implement did not move as commanded. Machine 100 via controller 104 may use information indicative of the pressure sensor results to identify that the implement command failed the self-test.

Machine 100 may then transmit the diagnostic results to an operator at the remote location (Step 314). In one embodiment, controller 104 may store the diagnostic results in an internal memory for later use. After machine 100 transmits the diagnostic results, machine 100 may enter a safe mode (Step 316). It is contemplated that machine 100 may enter the safe mode even if machine 100 cannot run a diagnostic test, or if machine 100 cannot transmit the diagnostic results. As an example, if the error identified in the self-test is associated with wireless communication device 102, machine 100 may not be able to transmit the results of the diagnostic self-test. In this example, machine 100 may still enter the safe mode, even though machine 100 was unable to transmit the results of the diagnostic self-test to an operator. In one embodiment, the safe mode may be machine 100 shutting down. If machine 100 passes the self-test (Step 310, Yes), machine 100 may then determine which mode of operation the operator selected (Step 318). If the operator selected the remote mode, machine 100 would enter the remote mode (Step 320). If the operator selected the autonomous mode, machine 100 would begin to enter the autonomous mode as described in FIG. 5 (Step 322).

Figure 4:
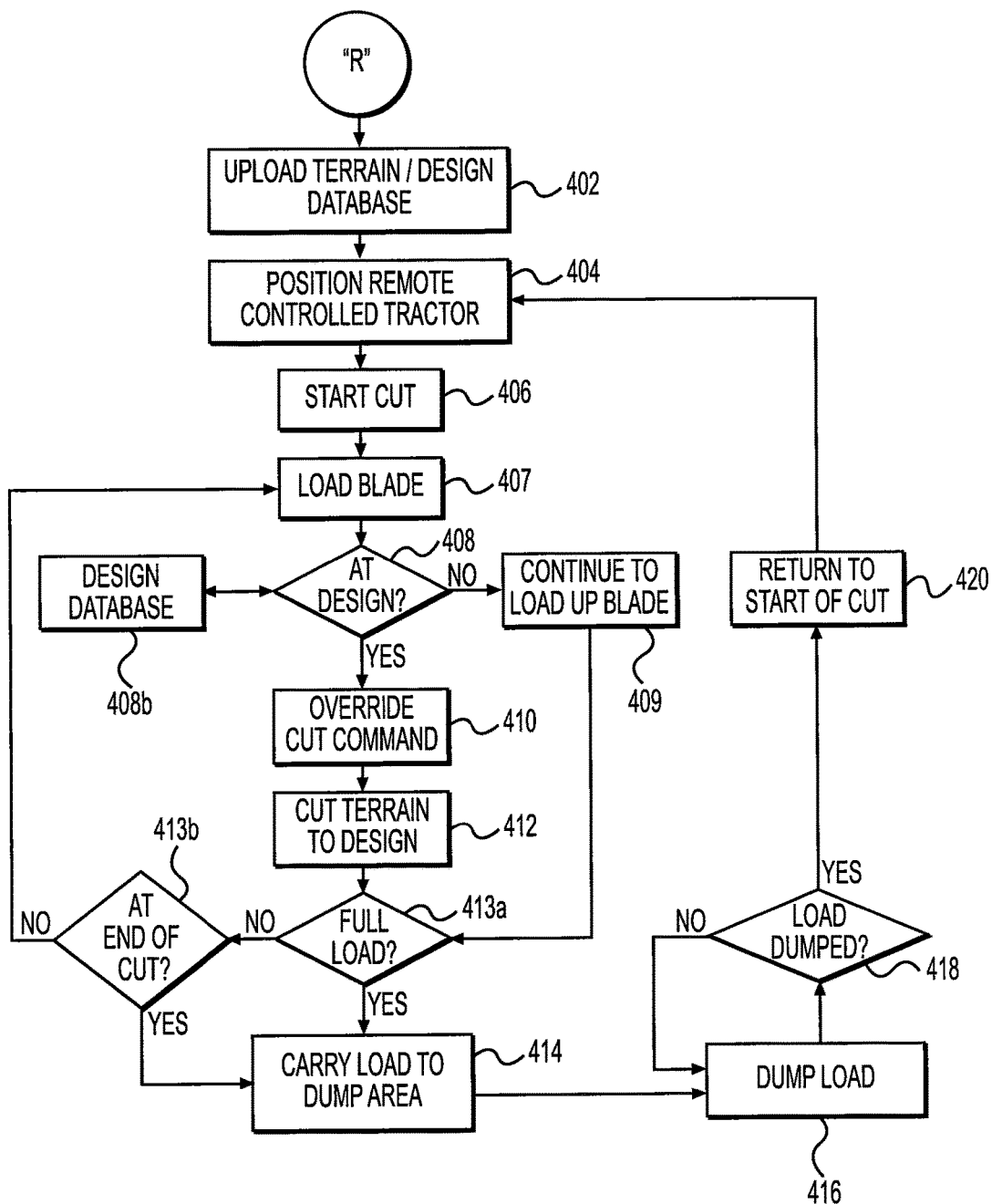
FIG. 4 is an exemplary method for operating the machine of FIG. 1 in a remote mode.

FIG. 4 shows a flowchart 400 illustrating a method for operating machine 100 in a remote mode consistent with the disclosed embodiments and their equivalents. For example, after machine 100 enters the remote mode, machine 100 may upload a terrain database to a memory in controller 104 (Step 402). The terrain database may include information indicative of a current terrain of a work environment, and a desired terrain of the work environment. As an example, a worksite may consist of a fossil fuel (e.g., coal), covered by one or more layers of overburden. In order to reach the fossil fuel, the layers of overburden must be removed. That is, in order to arrive at the desired terrain, e.g., the fossil fuel, the current terrain, e.g., the layers of overburden covering the fossil fuel, must be removed.

Information indicative of the current terrain of the worksite may be updated automatically in a memory of controller 104 via wireless communication device 102. As an example, controller 104 may communicate with GPS satellites via GPS satellite antenna 103 so that controller 104 may be continuously updated to the geographical and topographical information of the active worksite. As another example, controller 104 may communicate via wireless communication device 102 with a manager control station that is being continuously updated to the geographical and topographical information of the worksite. The manager control station may, via wireless communication device 102, continuously update controller 104 to the current geographical and topographical information of the worksite. It is contemplated that the desired terrain of the work environment may also be stored in a memory of controller 104 and updated automatically from the manager control station via wireless communication device 102. It is further contemplated that the current position and orientation of machine 100 and other machines at the worksite may be continuously updated in controller 104 via wireless communication device 102. It is also contemplated that the machine will update the geographical and topological information in controller 104 of machine 100 as the terrain is modified by machine 100.

After machine 100 is updated with the current and desired terrain geography and topography of the worksite, an operator may use a remote control to position machine 100 to where overburden is desired to be removed (Step 404). Once the operator has positioned machine 100, the operator may use the remote control device to remove overburden from the worksite by starting a cut of the terrain (Step 406). That is, the operator via a remote control may control machine 100 to load the blade or other implement of machine 100 to remove (or "cut") the top layers of overburden that covers (Step 407), for example, a fossil fuel or another resource that is desired to be removed from the worksite. While machine 100 is being used to remove the top layers of overburden from the worksite, machine 100 may monitor the current level of the terrain and compare the current level of the terrain with a threshold design level stored in a design database 408b (Step 408). If the blade depth is not at the desired design level (Step 408: No), machine 100 may be instructed to continue to load up the blade (Step 409) either until the blade is full (Step 413a) or until the design level has been reached.

If, after loading the blade, the blade is at the threshold design level (Step 408: Yes), the cut command may be terminated (Step 410) and the cut may be executed to remove overburden to the current blade level. While cutting, machine 100 may detect when the blade is full (Step 413a). If the blade is not full (Step 413a: No), and machine 100 is not at the end of the cut, as designed (Step 413b: No), machine 100 may be configured to load the blade (Step 407). If the blade is full (Step 413a: Yes) or if the blade is not full (Step 413a: No) but machine 100 is at the end of the designed cut, (Step 413b: Yes), machine 100 may carry the load to the dump area (Step 414) and dump the load (Step 416). If the load is completely dumped (Step 418), machine 100 may return to the start of the cut sequence (Step 420) by positioning the remote control tractor at or near the location of a desired cut (Step 404).

Figure 5:
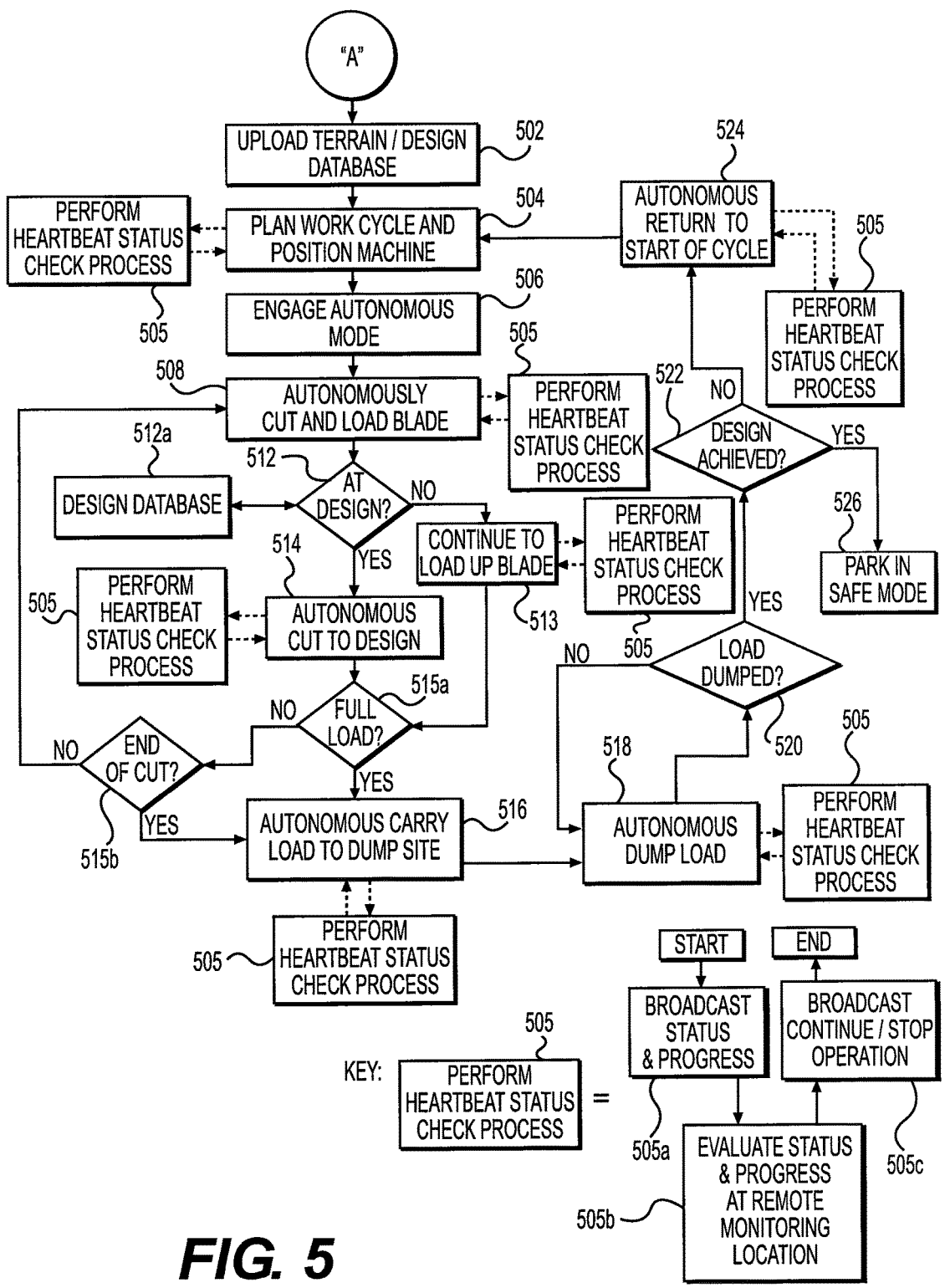
FIG. 5 is an exemplary method for operating the machine of FIG. 1 in an autonomous mode.

FIG. 5 shows a flowchart 500 illustrating a method for operating machine 100 in an autonomous mode consistent with the disclosed embodiments and their equivalents. For example, after machine 100 has passed the self-test, and before the machine 100 enters an autonomous mode, machine 100 may upload a terrain database to a memory in controller 104 (Step 502). Again, the terrain database may include information indicative of a current terrain of a work environment, and a desired terrain of the work environment. The uploading and updating of the terrain database may follow the same process as described in the embodiment of FIG. 4.

After machine 100 is updated with the current and desired terrain geography and topography of the worksite, machine controller 104 may plan the work cycle and position machine 100 to where overburden is desired to be removed (Step 504).

According to certain exemplary embodiments, if the machine is operating consistent with certain threshold operating parameters machine 100 may periodically perform a heartbeat status check process (Step 505). As shown in the "key" of FIG. 5, the heartbeat status check process commences with transmission of a status signal (e.g., a "heartbeat" signal) by machine 100 (Step 505a) to the remote control console or an autonomous monitoring system associated with machine 100. The status signal may include general machine status information, as well as project or task progress information. The remote control console, the autonomous monitoring system, or any other off-board analysis system may evaluate the status and progress of machine 100 from the remote location (Step 505b). Based on the analysis, the remote control console, the autonomous monitoring system, or the other off-board analysis system transmits either an authorization signal that allows machine 100 to continue autonomous operation or a "stop" command, which causes machine 100 to shut down autonomous operation of machine 100 (Step 505c).

For example, if machine 100 is not operating in a manner consistent with one or more threshold operating parameters, remote control console, the autonomous monitoring system, or the other off-board analysis system may be configured to generate a "stop" command. If, on the other hand, machine 100 is operating in a manner consistent with one or more threshold operating parameters, the remote control console, the autonomous monitoring system, or the other off-board analysis system may be configured to generate an authorization signal that allows machine 100 to continue autonomous operation.

Accordingly, while machine controller 104 positions machine 100 (as in Step 504), machine 100 may perform the heartbeat status check process (Step 505) and, assuming the status check process passes, machine 100 will be allowed to continue operation. It is contemplated that the heartbeat status check process (as in Step 505) may be performed at regular time intervals or during particular critical points during autonomous operation. In any case, if machine 100 is not operating consistent with threshold parameters, machine 100 will be shut down.

Once machine 100 is positioned at the desired location, the controller 104 may place machine 100 in autonomous mode (Step 506). Once machine 100 is placed in autonomous mode, machine 100 may autonomously begin the cutting process by loading an implement (e.g., blade) of machine 100 (Step 508). While machine is cutting/loading the implement, machine 100 may perform the heartbeat status check process (Step 505).

While machine 100 is being used to remove the top layers of terrain from the worksite, machine 100 may monitor the current level of the terrain and compare the current level of the terrain with a threshold design level stored in a design database 512a (Step 512). If the blade depth is not at the desired design level (Step 512: No), machine 100 may be instructed to continue to load up the blade (Step 513) either until the blade is full (Step 515a) or until the design level has been reached.

If, after loading the blade, the blade is at the threshold design level (Step 512: Yes), machine 100 may autonomously cut the terrain to the design level (Step 514). While machine is cutting the terrain, machine 100 may perform the heartbeat status check process (Step 505). While cutting, machine 100 may detect when the blade is full (Step 515a). If the blade is not full (Step 515a: No), and machine 100 is not at the end of the cut, as designed (Step 515b: No), machine 100 may be configured to load the blade (Step 508). If the blade is full (Step 515a: Yes) or if the blade is not full (Step 4515a: No) but machine 100 is at the end of the designed cut, (Step 515b: Yes), machine 100 may carry the load to the dump area (Step 516) and dump the load (Step 518). During each of steps 516 and 518, machine 100 may perform the heartbeat status check process (Step 505). If the load is completely dumped (Step 520: Yes), machine 100 determine if the desired terrain design profile has been met (Step 522) by comparing the current level of the terrain with a threshold design level stored in a design database 512a (as in Step 512). If the desired terrain profile has not been met (Step 522: No)), machine 100 may autonomous return to the start of the cycle (Step 524) by positioning machine 100 at or near the location of a desired cut (Step 504). If, on the other hand, the desired terrain design has been met (Step 522: Yes), machine 100 may park itself in safe made (Step 526).

Although the steps in flowcharts 300, 400, and 500 are described in relation to a particular work environment and particular machines, it is contemplated that the steps in flowcharts 300, 400, and 500 may be applicable to any working environment and/or any machine. Furthermore, the examples described in flowcharts 300, 400, and 500 are not intended to be limiting. For example, those familiar with the art will appreciate that the steps in flowcharts 300, 400, and 500 may consist of fewer or additional steps. In addition, it is contemplated that the steps in flowcharts 300, 400, and 500 may be performed non-consecutively.

It will be apparent to those skilled in the art that various modifications and variations can be made to the disclosed system and method. Other embodiments will be apparent to those skilled in the art from consideration of the specification and practice of the disclosed system and method. It is intended that the specification and examples be considered as exemplary only, with a true scope being indicated by the following claims.

What is claimed is:

1. A system for operating a machine, comprising:
an input device configured to select from a plurality of modes of operation for the machine, the plurality of modes of operation comprising a manual mode, a remote mode, and an autonomous mode;
a controller coupled to the machine, the controller configured to:
place the machine in the manual mode of operation in response to the selection of the manual mode;
perform a self-test of the machine in response to the selection of the remote mode or the autonomous mode;
place the machine in the selected remote mode or the autonomous mode only if the machine passes the self-test; and
place the machine in a safe mode if the machine does not pass the self-test;
a first transreceiver located on the machine and configured to transmit a heartbeat signal and receive a response signal; and
a second transreceiver located remote from the machine and configured to receive the transmitted heartbeat signal and transmit the response signal, wherein the heartbeat and the response signals are signals used to confirm that the machine is operating in a desired manner and shut down operation of the machine if the machine is operating in an undesired manner.

2. The system of claim 1, wherein, if the machine is in the autonomous mode, at least one operation of the machine stops if the heartbeat signal is not received at the receiver.

3. The system of claim 1, wherein a computer system coupled to the receiver is configured to:
determine if the machine is performing an authorized operation based on the heartbeat signal; and
send a first signal to the machine, the first signal allowing the machine to continue operating or shutting down the machine.

4. The system of claim 1, wherein the controller includes a mapping system, the mapping system used to operate the machine in the remote and the autonomous mode of operation.

5. The system of claim 1, wherein the mapping system is created based on desired operations of the machine.

6. A method for operating a machine, comprising:
selecting a single mode of operation for the machine from a plurality of modes of operation for the machine, the plurality of modes of operation comprising a manual mode, a remote mode, and an autonomous mode;
placing the machine in the manual mode of operation in response to the selection of the manual mode;
performing a self-test of the machine in response to the selection of the remote mode or the autonomous mode;
placing the machine in the selected remote mode or the autonomous mode only if the machine passes the self-test;
placing the machine in a safe mode if the machine does not pass the self-test; and
transmitting a heartbeat signal from the machine to a location remote from the machine and receiving a response signal from the location remote from the machine, wherein the heartbeat and the response signals are signals used to confirm that the machine is operating in a desired manner and shut down operation of the machine if the machine is operating in an undesired manner.

7. The method of claim 6, further including:
determining if the machine is performing an authorized operation based on the transmitted heartbeat signal; and
sending the response signal to the machine, the response signal allowing the machine to continue operating or shutting down the machine.

8. The method of claim 6, further including creating a mapping system based on desired operations of the machine.

9. A machine configured to operate in a plurality of modes, comprising:
a controller configured to:
detect a selected mode of operation based on an input at an input device, the selected mode of operation being one of a manual mode, a remote mode, and an autonomous mode; and
place the machine in the manual mode of operation in response to a selection of the manual mode;
perform a self-test of the machine in response to the selection of the remote mode or the autonomous mode;
place the machine in the selected remote mode or the autonomous mode only if the machine passes the self-test; and
place the machine in a safe mode if the machine does not pass the self-test; and
a communication device located on the machine configured to transmit a heartbeat signal to a location remote from the machine and receive a response signal from the location, wherein the heartbeat and the response signals are signals used to confirm that the machine is operating in a desired manner and shut down operation of the machine if the machine is operating in an undesired manner.

10. The machine of claim 9, wherein, if the machine is in the autonomous mode, at least one operation of the machine stops if the response signal is not received by the communication device.

11. The machine of claim 9, wherein a receiver coupled to a computer system located remote from the machine is configured to determine if the machine is performing an authorized operation based on the heartbeat signal.

12. The machine of claim 9, wherein the controller includes a mapping system, the mapping system being created based on desired operations of the machine.

* * * * *